(12) United States Patent
Maier et al.

(10) Patent No.: US 8,109,489 B2
(45) Date of Patent: Feb. 7, 2012

(54) METHOD AND SPRAY TOWER FOR CONTACTING GASES AND LIQUID DROPLETS FOR MASS AND/OR HEAT TRANSFER

(75) Inventors: Hermann Maier, Graz (AT); Rainer Wurzinger, Graz (AT)

(73) Assignee: Andritz Energy & Environment GmbH (AU)

( * ) Notice: Subject to any disclaimer, the term of this patent is extended or adjusted under 35 U.S.C. 154(b) by 1127 days.

(21) Appl. No.: 11/718,860

(22) PCT Filed: Oct. 21, 2005

(86) PCT No.: PCT/EP2005/055451
§ 371 (c)(1),
(2), (4) Date: Nov. 6, 2007

(87) PCT Pub. No.: WO2006/048385
PCT Pub. Date: May 11, 2006

(65) Prior Publication Data
US 2008/0308956 A1 Dec. 18, 2008

(30) Foreign Application Priority Data

Nov. 8, 2004 (EP) ..................................... 04026427

(51) Int. Cl.
*B01F 3/04* (2006.01)
(52) U.S. Cl. .......................... 261/128; 261/117; 261/148
(58) Field of Classification Search .................... 261/16, 261/109, 115, 117, 118, 128, 148, 150
See application file for complete search history.

(56) References Cited

U.S. PATENT DOCUMENTS

| 3,933,196 A | * | 1/1976 | Heller et al. ................... 165/100 |
| 4,164,256 A | * | 8/1979 | Kelp .............................. 165/125 |
| 4,266,951 A | | 5/1981 | Calvert |
| 5,250,267 A | | 10/1993 | Johnson et al. |
| 5,281,402 A | * | 1/1994 | Gohara et al. ................. 423/210 |
| 5,558,818 A | | 9/1996 | Gohara et al. |

(Continued)

FOREIGN PATENT DOCUMENTS

DE        100 58 548        10/2001

(Continued)

OTHER PUBLICATIONS

International search Report PCT/EP2005/055451 dated Dec. 16, 2005.

(Continued)

*Primary Examiner* — Charles Bushey
(74) *Attorney, Agent, or Firm* — Ostrolenk Faber LLP

(57) ABSTRACT

A method for contacting gases and liquid droplets for mass and/or heat transfer and a spray tower are disclosed, in which liquid is injected at a number of levels in counterflow to the gas, the gas being fed through at least two inlet openings in the shell of the spray tower. In this case, in order to reduce the differences in the contact duration, the flow direction of the gas at the inlet openings points into the internal region of the spray tower, which has a diameter of greater than or equal to 12 m, in particular greater than 20 m, such that the flow directions of the at least two gas streams intersect on their extension inside the spray tower, in particular at the center of the spray tower at up to half the spray tower radius downstream of the center of the spray tower.

11 Claims, 6 Drawing Sheets

U.S. PATENT DOCUMENTS

| | | | |
|---|---|---|---|
| 5,648,022 A | 7/1997 | Gohara et al. | |
| 6,488,899 B1 * | 12/2002 | Gohara et al. | 422/171 |
| 7,210,671 B2 * | 5/2007 | Bosman | 261/29 |

FOREIGN PATENT DOCUMENTS

| | | |
|---|---|---|
| EP | 1 018 360 | 7/2000 |
| EP | 1018360 B1 | 7/2003 |
| EP | 1629880 B1 | 2/2009 |
| JP | 52042428 U | 3/1977 |
| JP | 55 092125 | 7/1980 |
| JP | 62193625 A | 8/1987 |
| JP | 2001276553 A | 10/2001 |
| SU | 656646 A1 | 4/1979 |
| SU | 1057078 A1 | 11/1983 |

OTHER PUBLICATIONS

Japanese Examination Report dated Jul. 8, 2009 (English translation).

* cited by examiner

METHOD AND SPRAY TOWER FOR CONTACTING GASES AND LIQUID DROPLETS FOR MASS AND/OR HEAT TRANSFER

CROSS REFERENCE TO RELATED APPLICATION

The present application is a 35 U.S.C. §§371 national phase conversion of PCT/EP2005/055451, filed Oct. 21, 2005 which claims priority of European Patent Application No. EP04026427, filed Nov. 8, 2004 and incorporated herein by reference. The PCT International Application was published in the German language.

BACKGROUND OF THE INVENTION

The invention relates to a method for contacting gases and liquid droplets for mass and/or heat transfer in a spray tower in which liquid is injected at a number of levels in counterflow to the gas, the gas being fed through at least two inlet openings in the shell of the spray tower, and to a corresponding spray tower.

The invention can be applied in spray towers
for mass transfer between gases and liquid (absorption, desorption), for example for absorbing pollutants from exhaust gases, for example for flue gas desulfurization (open spray scrubbers) from acid exhaust gases of combustion processes in the industrial sector, power plants or waste incineration plants, or
for gas conditioning, gas moisture saturation and/or gas cooling, in particular of flue gases.

What is involved here is a method in which scrubbing liquid or water is injected as droplets into the mostly hot gas stream. The invention can be applied to common flue gas compositions and typical temperatures of around 200° C.

The most used method is the wet cleaning method based on an aqueous limestone-gypsum suspension. A suspension of water, gypsum and limestone is used in this case as scrubbing liquid. The solids concentration of the suspension is 10% by weight, as a rule. It consists predominantly of gypsum and a limestone concentration of between 2-3% by weight in the solid, that serves as absorber. The literature includes an overview of this method from Soud H. N., Takeshita M., FGD handbook, IEA Coal Research, London, 1994. A more up-to-date summary relating to flue gas desulfurization methods is to be found at DTI, Flue gas Desulphurisation (FGD) Technologies, Technology Status Report 012, http://www.dti.gov.uk/ent/coal, 03/2000.

It is customary to use the apparatus concept of the open spray tower for the absorption. In this case, gas is introduced into the spray tower, which has a round cross section according to the latest prior art, in the lower region of the contact zone, and led upward through the scrubbing zone. The contact zone—termed the absorber part in the case of desulfurization—is equipped with spray levels—piping at different heights, at the ends of which are seated spray nozzles—and situated between the bottom surface and uppermost spray level. The scrubbing liquid is injected into the rising gas stream in the form of droplets via various spray levels in counterflow thereto, and collected after the passage of the flue gas in the scrubber bottom situated therebelow. The circulation of the liquid flow is effected in this case via circulating pumps that convey the suspension from the scrubber bottom to the height of the spray levels.

In most spray towers, flue gas is introduced in this case in a lateral and radial fashion through a flue gas duct in the lower region of the contact zone of the absorber. The sole inlet opening has a cross-sectional area such that the inlet speed is in the region of 15 m/s for a maximum flue gas flow.

The liquid is atomized by one-material nozzles, and the majority of the droplets carry out a falling movement in counterflow to the gas until deposition on the scrubber wall or in the bottom.

The interaction resulting therefrom between gas and dispersed liquid results during operation in a multiphase flow that has a decisive effect on the mass and/or heat transfer between the phases. The effect of this in the case of $SO_2$ absorption is to determine the separation efficiency of the pollutant from the flue gas—or the efficiency of the flue gas saturation, for gas conditioning. An important parameter here is the dwell time distribution of the gas in the contact zone. It determines the average contact duration of the gas with the scrubbing liquid.

By contrast with the ideal flow, which is presupposed on designing the method, in the real spray tower there is no uniform upward or axial speed for the gas. That is to say, different axial speeds form in the cross section of the spray tower, and they can deviate significantly from the average speed.

In spray towers of industrial scale, above all, the gas dwell time influences the function of the apparatus. An uneven gas distribution in the contact zone leads to an irregular contact duration between the phases. The effect is a reduced or unbalanced mass transfer in the spray tower cross section that can be found again as a local high SO2 residual concentration in the pure gas in the case of flue gas desulfurization. It leads in the application for flue gas conditioning to the formation of gas strands in the conditioned flue gas that still have an increased temperature. They can damage downstream heat-sensitive apparatuses, or impair their functioning.

The gas dwell time is determined, firstly, by the type of droplet injection. A nonuniform injection with scrubbing liquid leads in the spray tower cross section to a different flow resistance that causes the gas to be deflected outward into regions of less pressure loss. As a result, the interaction with the injected liquid is also less for these partial gas streams.

The way in which the gas is introduced into the contact zone must be regarded as a second important factor. Particularly in the case of scrubbers of large diameter, the requisite transverse movement of the gas has an increasing effect in the contact zone that is necessary for a uniform gas feeding in the spray tower cross section. The ratio between the spray tower diameter D and height of the contact zone H normally varies between D/H=0.40-1.10.

In conventional spray scrubbers, the gas stream is introduced through a rectangular inlet into the spray scrubber with a round base surface. The curvature of the scrubber causes gas layers at the side walls of the gas duct which opens in to be led longer horizontally than those in the middle. Consequently, the gas stream in the middle of the inlet can shift earlier to an upward movement than in the edge zones. The portions of the gas stream at the lateral edge of the inlet advance further into the scrubber and reinforce the effect that is denoted in plant engineering as "edge flow" of the spray tower. What is involved here is the lesser content of scrubbing liquid in the wall zone by virtue of deposition of the droplets from near-wall nozzles on the apparatus wall. The internal region of the scrubber has, by contrast, a higher proportion of the liquid volume phase, since it is possible there for droplets to move longer on a flight path through the contact zone before they are deposited in the scrubber bottom.

In combination with increased gas speeds at the wall of the spray tower, the separation efficiency is perceptibly worsened in these regions, and can be detected in locally increased $SO_2$ residual concentrations in the purified gas. It is even possible in relatively small apparatuses for stagnation point flows to form at the spray tower wall, in which case undesired increased upward gas velocities can arise at the spray tower wall by virtue of the deflection.

Furthermore, the gas flow of the conventional radial inlet induces a compensating eddy in the cross section. The turbulent flow leads to a reduction of the kinetic energy contained in the gas. The dissipation occurring because of the turbulence takes place in a region where the flow resistance owing to liquid droplets is also greatest in the two-phase state. The gas movement is undesirably slowed down in a region in which the gas has already covered a lengthy path through the contact zone. Moreover, the gas experiences an increased resistance there owing to a higher volume phase fraction of droplets, and the tendency of the gas to be deflected outward additionally exists during operation. There necessarily ensues in the horizontal cross section of the spray tower an irregular contact duration with the dispersed scrubbing liquid and the consequences already mentioned for the mass transfer.

Similar problems also arise with the spray tower of DE 100 58 548 C1, where the gas is introduced tangentially into the spray tower through two separate opposite gas ducts. A horizontal circulatory flow is set up there in the lower region of the absorption zone.

SUMMARY OF THE INVENTION

It is therefore an object of the invention to reduce the differences in the contact duration, and to direct the incoming flue gas predominantly into the internal region of the scrubber with a higher proportion of scrubbing liquid.

The gas is introduced through at least two inlet openings in the shell of the spray tower such that the flow directions of the at least two gas streams intersect on their extension inside the spray tower, the section in which the gas runs at the curved scrubber wall is minimized, and thus the lengthy horizontal movement of the gas at the spray tower wall is reduced. The edge flow is thereby reduced.

In addition, the gas flow is directed more strongly into the internal region of the spray tower to those zones with a higher liquid proportion. A more intensive interaction takes place between flue gas that is still unpurified or unconditioned and the liquid in the internal region of the contact zone, where a higher volume phase fraction of the liquid is also present.

Finally, the gas inflow induces a horizontal eddy in the spray tower, in the case of which the gas, which still has an increased kinetic energy, can advance into the more sensitive wall zone of the spray tower only after passing the center of the spray tower, which is more strongly affected by droplets. The result is an increase in the interaction between the phase fractions, a consequence of which is also an improvement in the mass transfer. The dwell time of the gas in the contact zone is improved by the induced horizontal movement. The invention thus enables a more efficient introduction of the gas in spray towers.

As a further advantage, it may be mentioned that the inlet speed of the gas can be increased without the risk of producing stagnation point flows at the wall, since the fraction of the gas stream with the highest horizontal speeds is directed into the internal region of the spray tower.

The feature that the flow directions of the at least two gas streams (at the inlet openings) intersect on their extension inside the spray tower is aimed at the midpoint of the flow. The position of the point of intersection at the center of the spray tower at up to half the spray tower radius downstream of the center of the spray tower (seen in the flow direction) has proved to be particularly preferred for achieving the effect according to the invention.

In combination with the horizontal introduction of the gas, there is the advantage here of attaining the greatest possible gas penetration depth. This enables a more uniform gas distribution in spray towers of large diameter.

A range of 45° to 120°, which is adapted depending on the size of the spray tower, is suitable as angle between the axes of symmetry of the gas inlets. By adapting the angle between the gas inlets and the gas inlet speed, the depth of penetration of the gas stream can be tuned to the scrubber size and/or the scrubber diameter.

In the case of spray towers of relatively small diameter, the angle is increased, and there is an interaction between the partial gas streams which, even given a relatively high gas inlet speed, has the effect of reducing the horizontal gas speed and/or the depth of penetration into the spray tower. The risk of undesired stagnation point flows at the wall of the spray tower is thus at least minimized, but entirely avoided in the normal case.

The larger the diameter of the spray tower, the smaller the angle between the inlets, and the higher the inlet speed is selected. The liquid dispersed phase causes a different flow resistance—depending on the required separation efficiency—through different volume flows and different gas/liquid ratios (G/L ratios) during operation.

It follows from this that the inlet area of the gas inlet can likewise be reduced. Moreover, the opening cross sections of the inlet openings together exhibit a lesser curvature at the scrubber wall (or require a smaller angle) than the corresponding opening cross section of a single inlet opening. For these reasons, it is possible to attain savings in terms of design and cost as against the conventional design, for example owing to the smaller continuous opening width in conjunction with the same inlet area smaller static supports are required in the inlet openings (support structures).

A range of 10-25 n/s, in particular a range from 14 to 16 m/s, is advantageous as inlet speed in the inlet cross section. In normal operation, the inlet speeds or gas volume flows at the inlet into the spray tower exhibit only a slight difference. The speed difference between the individual inlets can, however, also be up to 50% without impairment to the method according to the invention.

The invention is particularly suitable for spray towers of large cross sections, specifically for spray tower diameters of greater than or equal to 12 m, in particular greater than 20 m, since the problems discussed at the beginning are particularly to the fore here.

BRIEF DESCRIPTION OF THE DRAWINGS

The invention is explained by way of example using an exemplary embodiment and with the aid of FIGS. 1 to 8, in which.

DESCRIPTION OF THE PREFERRED EMBODIMENTS

Figure 1:
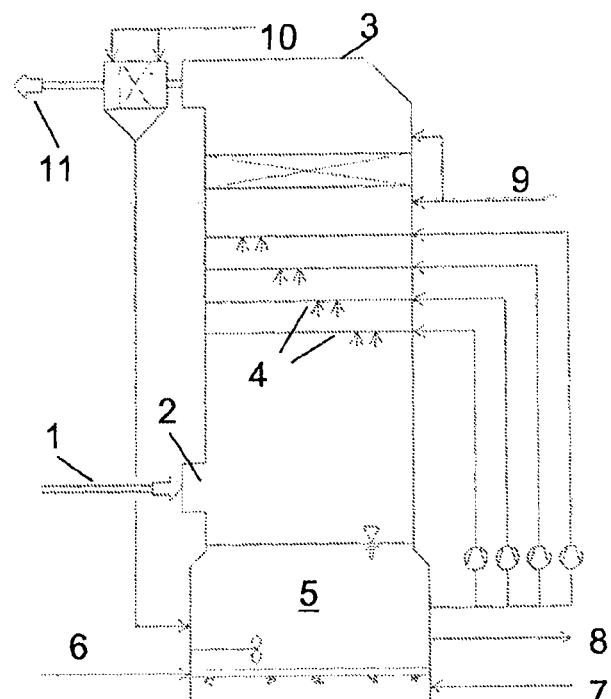
FIG. 1 shows a spray tower according to the prior art.

A conventional open spray tower with a single radial introduction of gas for the purpose of flue gas desulfurization is illustrated in FIG. 1. The spray tower has a circular base surface and a cylindrical shell. The raw gas 1 is inlet horizontally into the contact region of the spray tower 3 through a single inlet opening 2. Suspension that gathers in the scrubber bottom 5 is injected in the spray tower from spray nozzles 4. Said scrubber bottom is gassed with the aid of oxidizing air 6. On the one hand, a portion of the suspension is led again from the bottom 5 into the spray nozzles 4 via circulating pumps, and on the other hand excess suspension is withdrawn via a line 8 to the hydrocyclone. Furthermore, fresh suspension 7 is fed to the bottom 5. Above the spray nozzles, the gas is purified using rinsing water 9, likewise after the outlet from the spray tower 3 by rinsing water 10 before it is withdrawn as pure gas 11.

Figure 2:
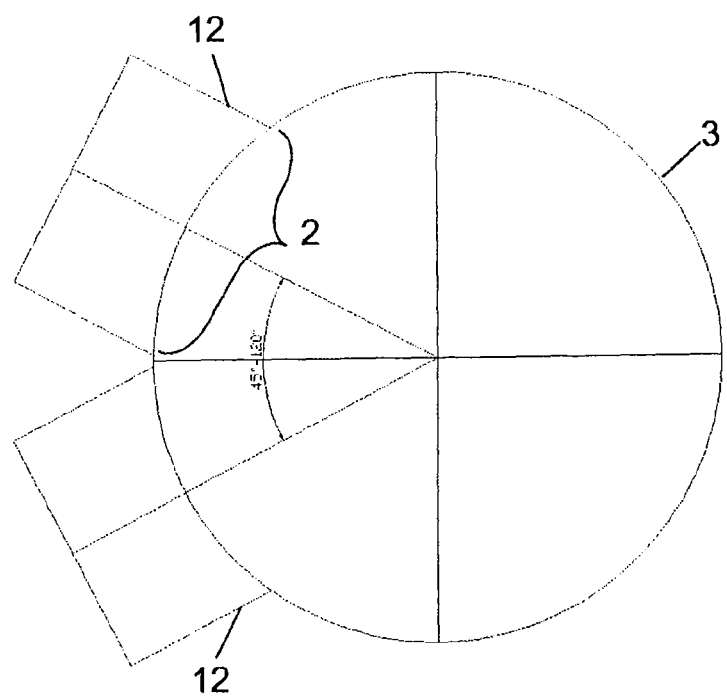
FIG. 2 shows a sketch of the gas inlets of a spray tower according to the invention.

The inventive spray tower in accordance with FIG. 2 differs from the spray tower in FIG. 1 in that it has two separate gas ducts 12 that respectively open into an inlet opening 2. The axes of symmetry of the gas ducts enclose an angle of approximately 55° here. The large spray tower illustrated here is designed for a flue gas throughput of $4.75 \times 10^6$ Nm$^3$/h, and has a diameter of 23.6 m. It was possible for the number of support columns in the inlet to be reduced by 50% in comparison to the conventional design with one inlet. The spray tower shown here has two gas ducts 12 of equal size. The invention can, of course, also be applied to two or more differently dimensioned gas ducts.

Figure 3:
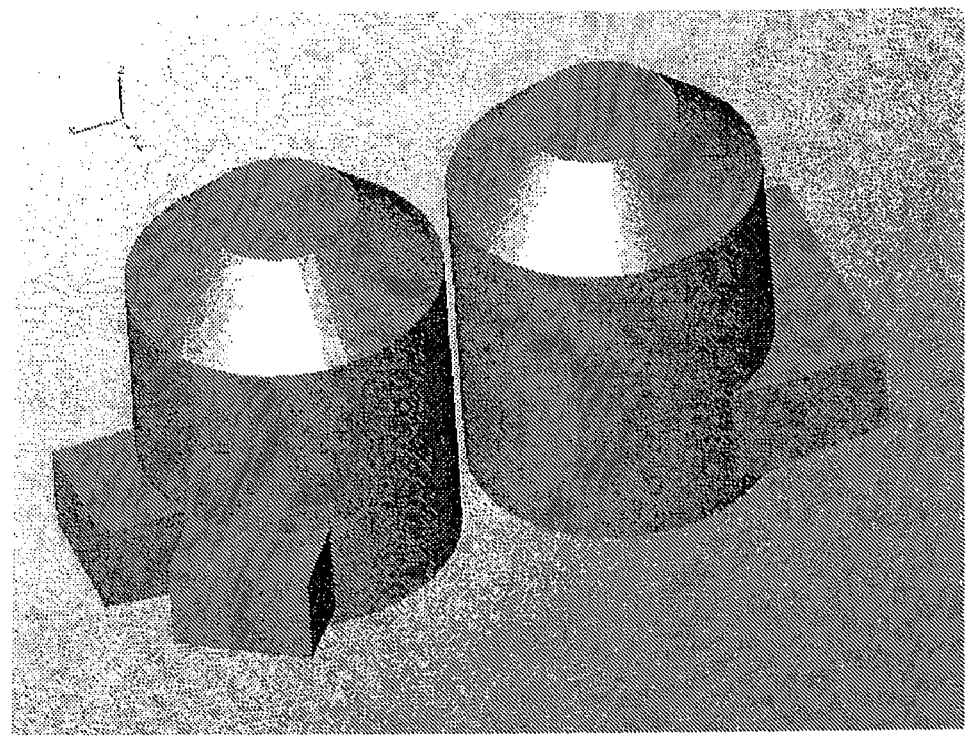
FIG. 3 shows a perspective view of an inventive spray tower (left) and of a conventional spray tower (right)
Figure 4:
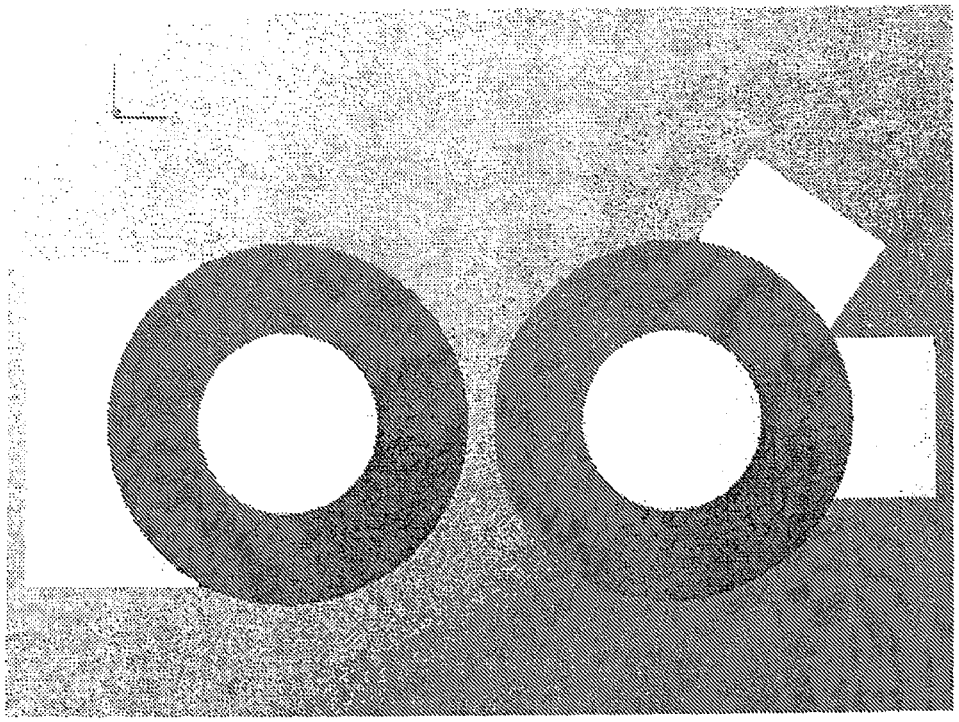
FIG. 4 shows a plan view of an inventive spray tower (right) and of a conventional spray tower (left)

An inventive spray tower is illustrated on the left of FIG. 3, and a conventional one on the right. An inventive spray tower is illustrated in FIG. 4 on the right, and a conventional one on the left. The respective cylindrical shells are closed at the top by a frustoconical part. The gas ducts have a rectangular cross section in both cases. Illustrated between the inlet openings of the inventive spray tower is a part of the shell of the spray tower that separates the two inlet openings from one another.

Figure 5A:
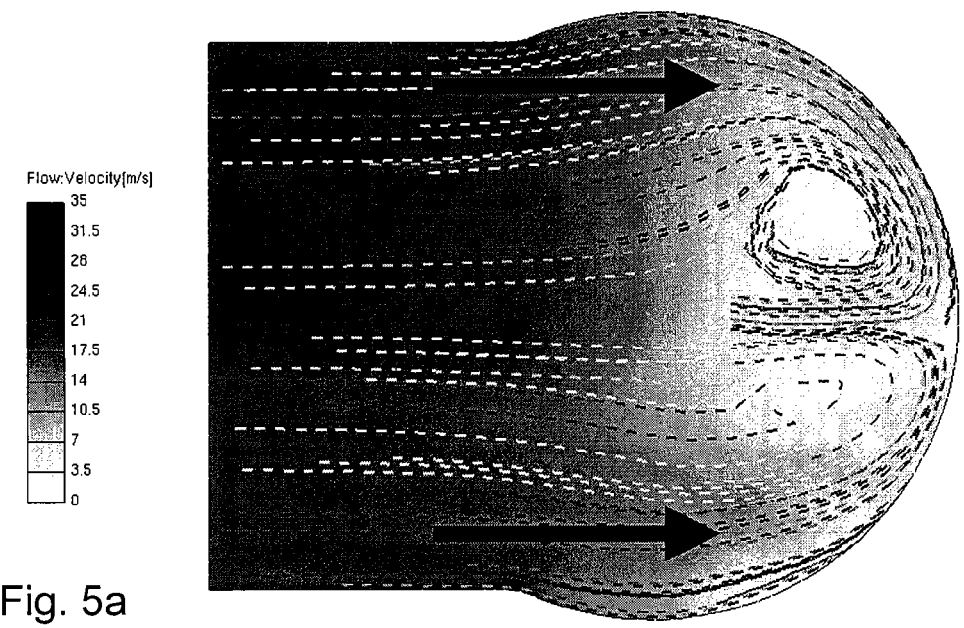
FIGS. 5*a* and 5*b* show the inflow behavior of a conventional spray tower at the level of the gas inlet.
Figure 5B:
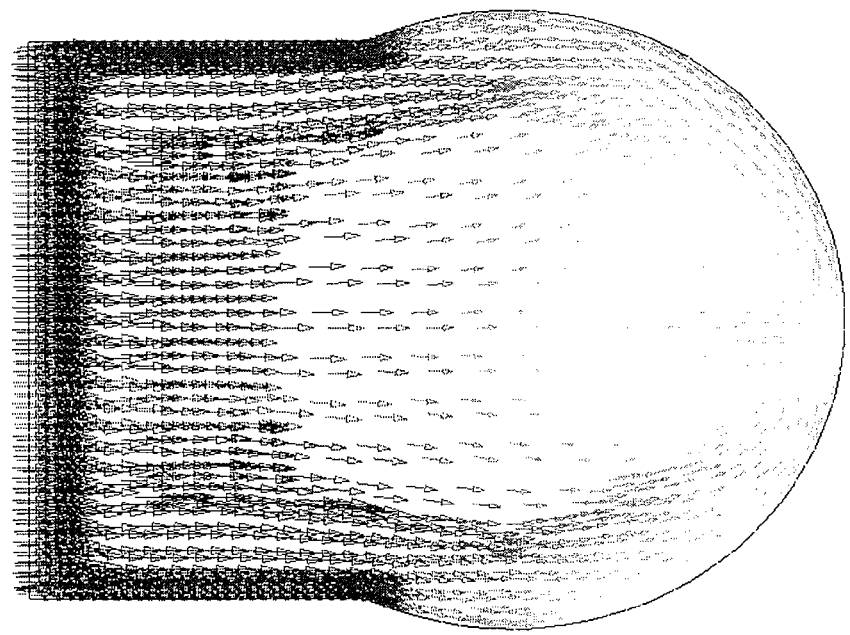

FIGS. 5a and 5b show a horizontal section through a conventional spray tower at half the height of the gas duct 12 or the inlet opening 2. Specifically, in FIG. 5a the dashed lines specify the streamlines of the gas flow, the gray hue of the background being a measure of the speed of the gas. At the edge of the picture on the left is a scale that reproduces the color assignment of the individual gray tones to concrete speeds.

The thick black arrows mark regions of highest horizontal speed. The gas flows from the left into the spray tower. In FIG. 5b, the gas flow is represented as a vector image. The size and the direction of the individual vectors are a measure of the absolute value and direction of the gas flow at this point.

Figure 6A:
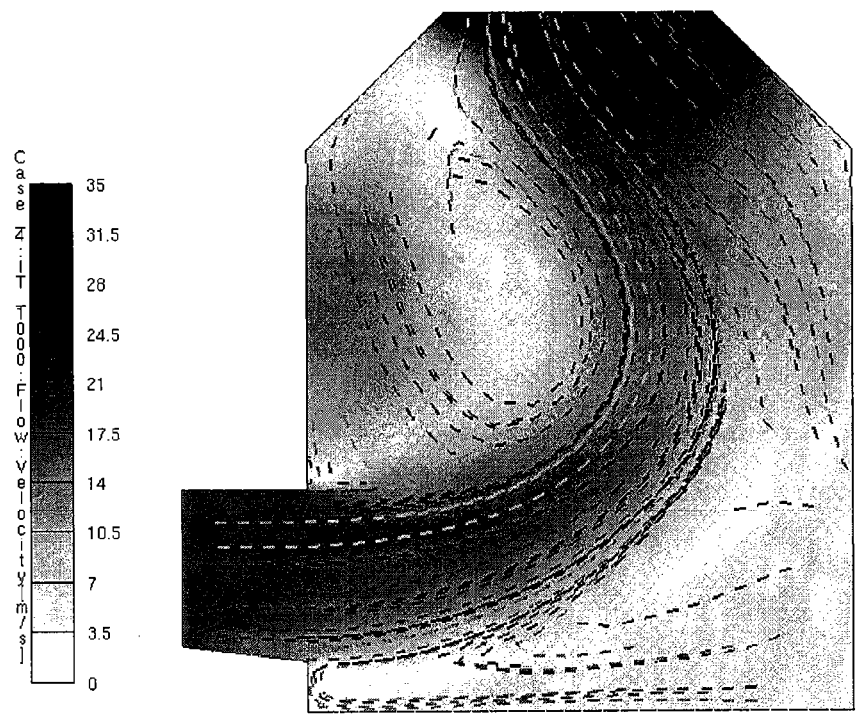
FIGS. 6*a* and 6*b* show the inflow behavior of a conventional spray tower in the longitudinal section of the gas inlet.
Figure 6B:
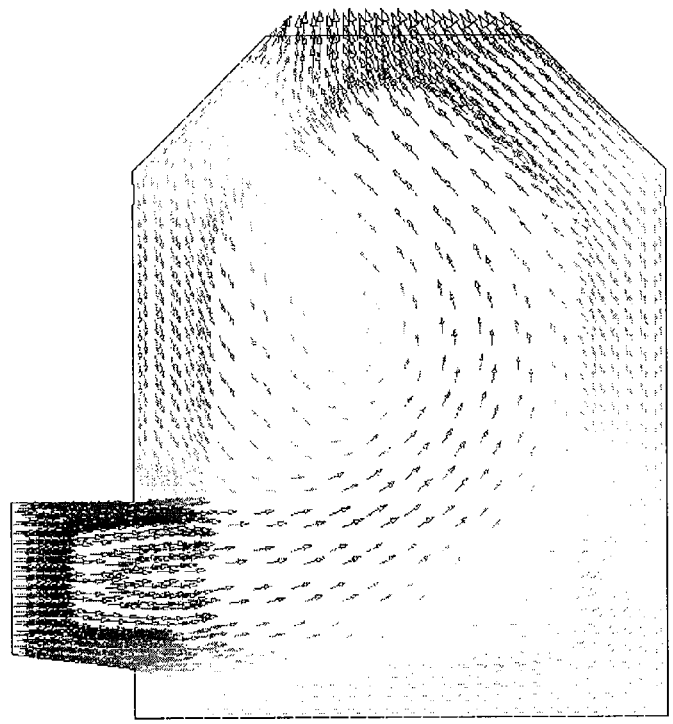

A longitudinal section in the plane of symmetry of the spray tower (that is to say through the middle of the gas duct) is illustrated in FIGS. 6a and 6b. The dashed lines of FIG. 6a again specify the streamlines of the gas flow, while the gray hue of the background is a measure of the speed of the gas for which, once again on the left, the scale with the assignment to concrete speed values is given.

In FIG. 6b, the gas flow is represented as a vector image. The size and the direction of the individual vectors are a measure of the absolute value and direction of the gas flow at this point.

Figure 7A:
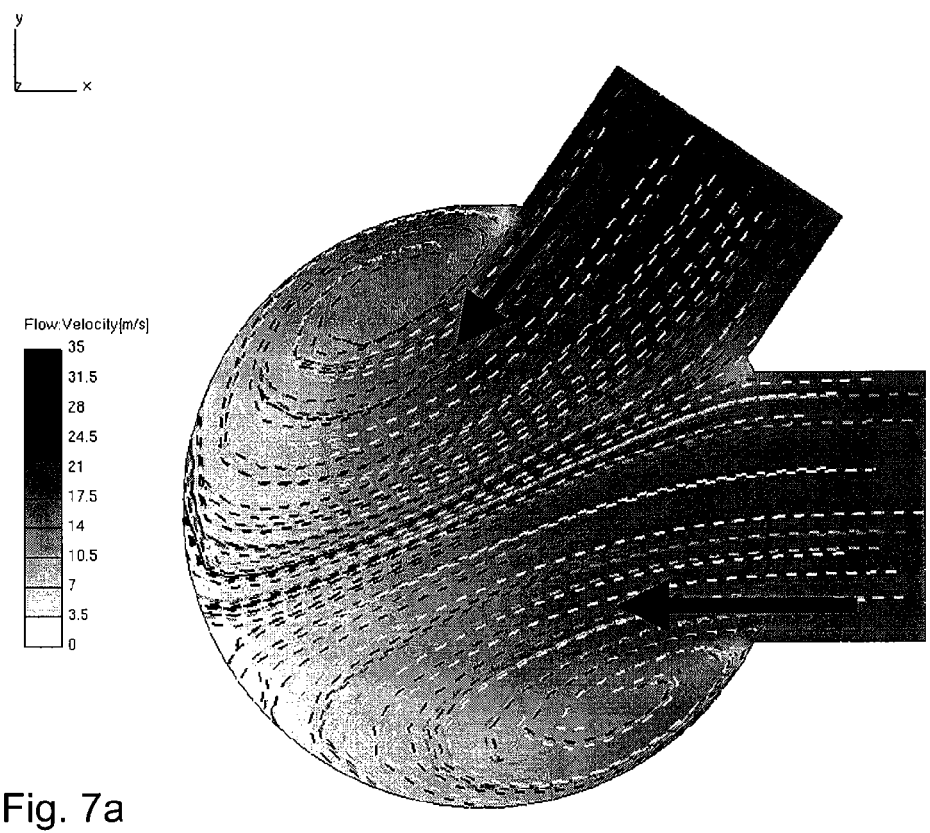
FIGS. 7a and 7b show the inflow behavior of a spray tower according to the invention at the level of the gas inlet.
Figure 7B:
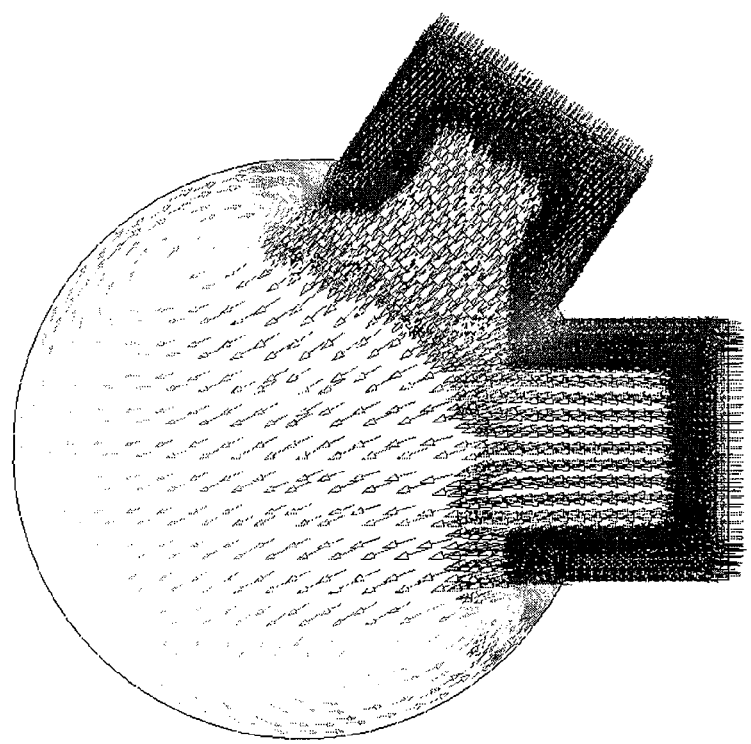

A horizontal section through an inventive spray tower at half the height of the gas duct 12 or of the inlet openings 2 is shown in FIGS. 7a and 7b. Specifically, in FIG. 7a the dashed lines again specify the streamlines of the gas flow, the gray hue of the background is again a measure of the speed of the gas with a corresponding scale on the left-hand edge of the picture. The thick black arrows mark regions of highest horizontal speed. The gas flows into the spray tower from the right or top right. The gas flow is illustrated as a vector image in FIG. 7b. The size and the direction of the individual vectors are a measure of the absolute value and direction of the gas flow at this point.

Figure 8A:
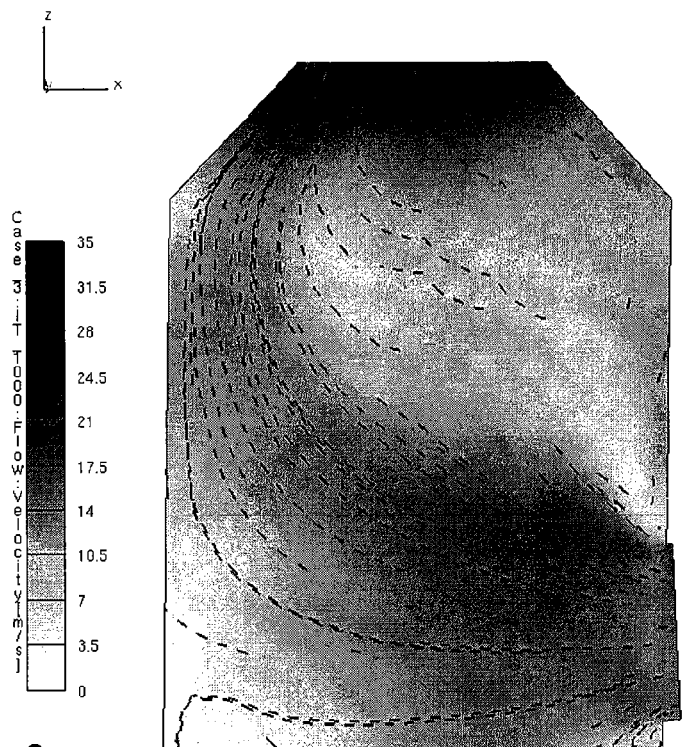
FIGS. 8a and 8b show the inflow behavior of a spray tower according to the invention in longitudinal section.
Figure 8B:
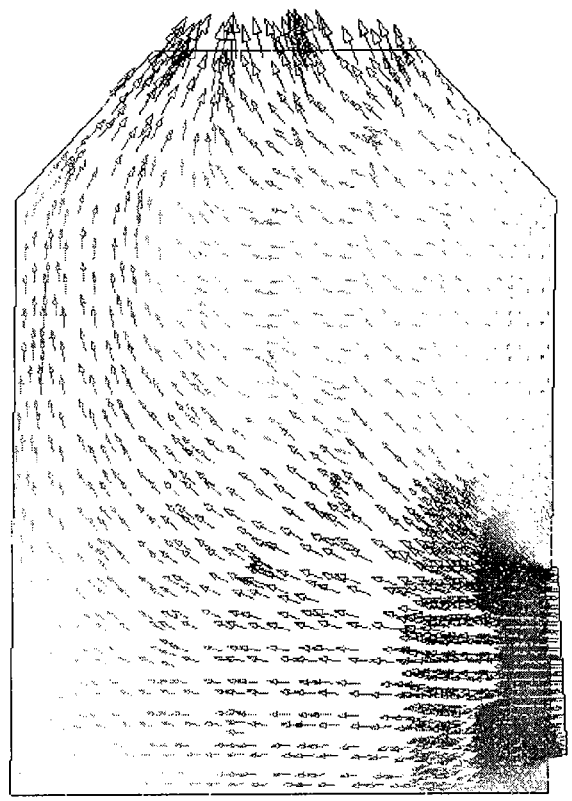

FIG. 8a illustrates a longitudinal section that passes through the center of the spray tower and the axis of symmetry of a gas duct. It is evident that the gas flow traverses the lower region of the spray tower with a relatively uniformly distributed speed, the gas flow penetrating deeper into the spray tower than in the conventional feeding of gas with the aid of a gas duct (FIGS. 6a and 6b). The space opposite the inlet openings that has very low speeds is clearly reduced in comparison to the conventional feeding of gas. Likewise, the vertical eddy above the inlet opening in FIGS. 6a and 6b, which likewise has very low speeds, has been disposed of. The gas flow is illustrated as a vector image in FIG. 8b.

The invention was checked by means of a numerical flow calculation (Computational Fluid Dynamics—CFD). In addition to single-phase flows, it is thereby also possible to image multiphase flow states in the spray tower by calculation on the computer, and to optimize them as a result. An experimental measurement of the flow profile can be done in large-scale units only to a limited extent or indirectly (for example via temperature or concentration profiles downstream of the contact zone). By contrast, flow calculation enables the visualization of the three-dimensional flow present in the apparatus.

Simulation was performed by using the commercial CFD software package AVL FIRE v7.3 (see AVL, Fire Manual Version 7, Graz, 2001), which has proved to be very effective for the numerical investigation of such single-phase and multiphase flow processes, and has come to be applied in many fields.

The numerical solution of the continuous gas flow in the spray tower was carried out using the finite volume method. To this end, a three-dimensional numerical grid model of the spray tower to be investigated was prepared; it defines the subdivision of the entire volume of space to be considered into individual volume elements that are denoted as control volumes. Models of physical and, if appropriate, chemical processes are solved in each of these volume elements. The temporal and spatial change in heat and mass flows in a control volume is balanced over its lateral surfaces. The more accurately a flow region being investigated is resolved—in other words the higher the number of the volume elements used—the more accurately the flow field is calculated, as a rule. The single-phase gas flow is calculated up to when the stationary flow state is reached.

Model droplets that represent the scrubbing suspension are introduced with defined properties into the stationary solution of the single-phase gas flow at the injection sites provided. The calculation of the flight paths of the droplets in the gas flow is performed using the principle of the Euler Lagrange or Discrete Droplet Method (DDM, see AVL, Fire Manual Version 7, Graz, 2001 and Crowe C., Sommerfeld M., Tsuji Y., Multiphase flows with droplets and particles, CRC Press, Boca Raton, 1998). Here, the movement of the physical particles is carried out by a statistical number of numerical model particles. Each model particle stands for a specific number of real particles that have the same physical properties (packet factor). Multiplication by the packet factor balances the conservation laws for mass, energy and momentum between the phases.

The interaction between gas and dispersed liquid follows the principle of Two Way Coupling. After achievement of a quasi-stationary solution for the multiphase flow at an operating point, the calculated flow field of the gas phase and the particle movement can be investigated three-dimensionally on the computer.

The software system was parameterized specifically for this application. Validation was performed with the aid of experimental measurements of the $SO_2$ separation from large industrial scrubbers of similar design and overall size, or by dynamic investigations in pilot plants (see also Maier H., Integration der $SO_2$-Chemisorption in die numerische 3D-Strömungssimulation von Rauchgaswäschern ["Integration of $SO_2$ chemisorption in numerical 3D flow simulation of flue gas scrubbers"], Dissertation, TU Graz, 2003; and Wieltsch U., Experimentelle und numerische Untersuchung des zweiphasigen Strömungszustandes in Sprühwäschern, ["Experimental and numerical investigation of the two-phase flow state in spray scrubbers"], Dissertation, TU Graz, 1999).

The invention claimed is:

1. A method for contacting gases and liquid droplets for mass and/or heat transfer in a spray tower in which liquid is injected at a number of levels in counterflow to the gas, the gas being fed through precisely two separate gas ducts, each of the gas ducts opening into an inlet opening in the shell of the spray tower, wherein the flow direction of the gas at each of the inlet openings points into the internal region of the spray tower, which has a diameter of greater than or equal to 12 m, such that the respective midpoints of the precisely two gas streams from the two separate gas ducts intersect in their extension inside the spray tower, at a point of intersection in a region between and including a first end at the center of the spray tower and a second end at half the spray tower radius downstream of the center of the spray tower, the angle between the axes of symmetry of the gas ducts being greater than or equal to 45° and less than or equal to 120°.

2. The method as claimed in claim 1, wherein the gas is introduced horizontally.

3. The method as claimed in claim 1, wherein the gas is introduced at a speed of between 10 and 25 m/s.

4. The method as claimed in claim 2, wherein the gas is introduced at a speed of between 10 and 25 m/s.

5. The method as claimed in claim 1, wherein the spray tower has a diameter of greater than 20 m.

6. The method as claimed in claim 1, wherein the gas is introduced at a speed of between 14 and 16 m/s.

7. The method as claimed in claim 2, wherein the gas is introduced at a speed of between 14 and 16 m/s.

8. A spray tower for contacting gases and liquid droplets for mass and/or heat transfer, comprising devices for injecting liquid at a number of levels in counterflow to the gas, precisely two inlet openings in the shell of the spray tower for feeding gas and precisely two gas ducts, each gas duct respectively opening into an inlet opening, wherein the gas ducts leading to the inlet openings are arranged such that the flow direction of the gas at the inlet opening points radially into the internal region of the spray tower, which has a diameter of greater than or equal to 12 m, such that the flow directions of the precisely two gas streams intersect in their extension inside the spray tower, at a location in a region including a first end at the center of the spray tower and a second end at half the spray tower radius downstream of the center of the spray tower, the angle between the axes of symmetry of the gas ducts being greater than or equal to 45° and less than or equal to 120°, wherein the gas ducts are aligned in the region upstream of the inlet opening such that the axes of symmetry of the gas ducts intersect inside the spray tower, at a location in a region including a first end at the center of the spray tower and a second end at half the spray tower radius downstream of the center of the spray tower.

9. The spray tower as claimed in claim 8, wherein the gas ducts are arranged horizontally in the region upstream of the inlet opening.

10. The spray tower as claimed in claim 8, wherein the spray tower has a diameter of greater than 20 m.

11. The spray tower as claimed in claim 8, wherein the gas ducts are arranged horizontally in the region upstream of the inlet opening.

* * * * *